A. H. BENNINGTON.
GEAR SHIFTING MECHANISM.
APPLICATION FILED JULY 28, 1916.
1,220,935.
Patented Mar. 27, 1917.
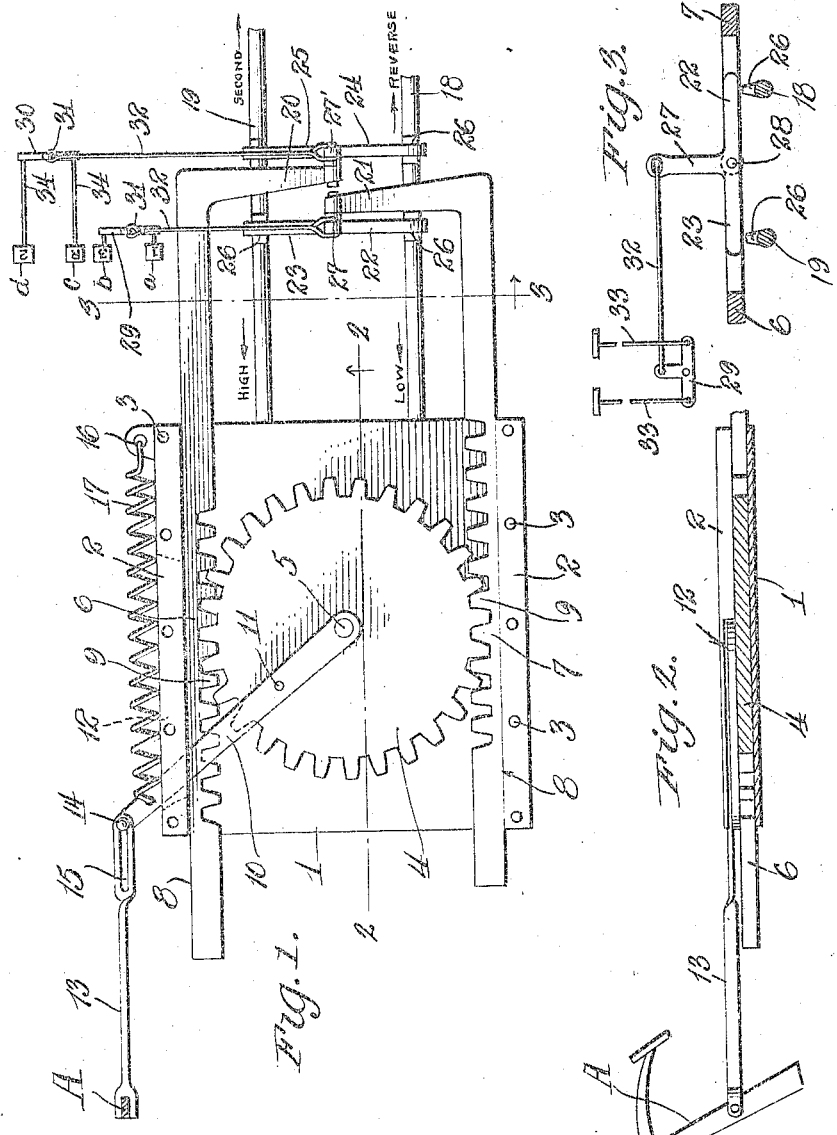
INVENTOR
Albert H. Bennington
WITNESSES
BY
ATTORNEY

UNITED STATES PATENT OFFICE.

ALBERT H. BENNINGTON, OF PARK RIVER, NORTH DAKOTA.

GEAR-SHIFTING MECHANISM.

1,220,935.

Specification of Letters Patent.

Patented Mar. 27, 1917.

Application filed July 28, 1916. Serial No. 111,897.

*To all whom it may concern:*

Be it known that I, ALBERT H. BENNINGTON, a citizen of the United States, residing at Park River, in the county of Walsh and State of North Dakota, have invented certain new and useful Improvements in Gear-Shifting Mechanism, of which the following is a specification.

This invention relates to gear shifting mechanism and more particularly to a device adapted to coöperate with the clutch pedal and the transmission of an automobile whereby the gears in the transmission may be shifted to various speeds through the medium of the clutch pedal.

One of the objects of the invention is to provide a connection with the clutch pedal for shifting the gears in the transmission, the particular position of the gears being obtained through a connection with a plurality of buttons arranged adjacent a steering wheel whereby any speed change may be accomplished by pressing one of the buttons and releasing the pressure from the clutch pedal.

A further object of this invention is the provision of a gear shifting mechanism which consists of comparatively few parts and is simple in construction, but durable and well adapted to withstand the rough usage to which devices of this character are ordinarily subjected.

For a full description of the invention and the advantages and merits thereof, reference is to be had to the following description and the accompanying drawings, wherein is illustrated the preferred form of my invention, in which;

Figure 1 is a top plan view of the mechanism showing the same connected to the clutch pedal of an automobile.

Fig. 2 is a vertical longitudinal section on the line 2—2 of Fig. 1.

Fig. 3 is a transverse section on the line 3—3 of Fig. 1.

A substantially square supporting plate 1 is provided on two of its opposite edges with the upstanding ribs 2 having a plurality of apertures 3 which are adapted to receive fastening bolts or screws for securing the plate 1 to the underside of the floor of an automobile. The plate will thereby be suspended beneath the automobile and the space between the floor and the plate 1 is adapted to receive a spur-gear 4 mounted on a pivot pin 5 whereby the gear may be rotated when desired. Rack bars 6 and 7 are mounted adjacent opposite edges of the plate, their outer edges 8 being in sliding engagement with the edges of the ribs 2 while the inner edges of the rack bars are provided with a plurality of teeth 9 adapted to mesh with the teeth of the spur-gear 4 whereby the rack bars may be operated when the spur-gear is rotated.

For rotating the gear 4, I provide a crank arm 10 which is connected to the pivot pin 5 and is secured to the spur-gear by the fastening rivet or bolt 11. The rib 2 at one edge of the plate is provided with a slot 12 through which the crank arm 10 extends so that its end may be disposed at one side of the edge of the plate 1. A connecting rod 13 has one end connected to the foot pedal A which is the usual pedal provided for operating the clutch of the automobile. The opposite end of the rod 13 is connected to the free end of the crank arm 10 by the bolt 14 which extends through a slot 15 in the connecting rod 13. A lug 16 is integrally formed with one corner of the plate 1 at the rear end thereof and receives one end of a contraction spring 17, the opposite end of the spring being connected to the crank arm 10 for a purpose presently described.

The gear shifting rods 18 and 19 are connected in the usual manner to the transmission of the automobile so that the gears may be shifted when the appropriate movement is imparted to either of the rods 18 and 19. For the purposes of this description, it has been thought advisable to indicate the movement which each gear shifting rod 18 and 19 should take to shift the gears in the transmission to obtain the various speeds namely, "high" speed, "second" speed, "low" speed and "reverse." It will be observed that when the rod 19 is moved in the directions indicated by the arrows, high speed or second speed may be obtained, and when the rod 18 is moved in the directions indicated by the arrows, low speed or "reverse" will be obtained. These various movements are accomplished through the medium of the rack bars 6 and 7 which are provided at their rear ends with right angularly disposed retaining arms 20 and 21 the terminals of which are disposed directly above a point half way between the two rods 18 and 19. Pivotally mounted on the end of the retaining arm 21 are the oppositely extending operating fingers 22 and 23 while pivotally mounted on the retaining arm 20 are the operating fingers 24 and 25. A pair of notches 26 are formed in each of the gear shifting rods 18 and 19 and are adapted to receive the end of either of the operating fingers when the gears are to be shifted. Standards 27 and 27' are integrally formed with each pair of operating fingers and extend upwardly directly above the pivot pin 28 which connects the operating fingers with the retaining arms.

In order that any one of the operating fingers 22, 23, 24 or 25 may be moved into one of the notches 26, I provide a plurality of buttons, *a*, *b*, *c* and *d* which are preferably arranged near the steering wheel of the automobile so that they will be within convenient reach of the driver. It will be observed that in order that the operating fingers may be made to engage the notches 26, a pull or a thrust motion must be imparted to the standard 27 on the standard 27'. To accomplish this I provide the rocker arms 29 and 30 which are pivoted at their centers to any convenient part of the automobile structure and whereby they will be disposed in a position to receive the ends 31 of the links 32 which connect the rocker arms 29 and 30 with the standards 27 and 27'. The opposite ends of the rocker arm 29 are connected, by the push rods 33 to the operating buttons *a* and *b* while the rocker arm 30 is connected to the operating buttons *c* and *d* by the push rods 34.

It is well known that when the clutch pedal, in various types of automobiles, is pushed forwardly, the clutch is thereby thrown "out." By releasing the foot pressure on the pedal the pedal is thrown backwardly and the clutch is thereby thrown "in." This operation is taken advantage of in the above described mechanism and the gears are shifted and the clutch thrown "in" simultaneously. As shown by Fig. 1 of the drawing the clutch pedal has been pushed forwardly thereby releasing the clutch and the tension spring 17 has been tensioned and the spur-gear rotated through the medium of the crank arm 10. This operation thereby moves the rack bars until the operating fingers 22, 23, 24 and 25 are disposed directly above all of the notches 26. Apropos of the above, it will be noted that the operating fingers and the retaining arms 20 and 21 are raised clear of the notches 26 until such time as one of the buttons is pressed. Continuing the description of the operation it will be observed, from the drawing that the clutch is still released when in the position shown and the gear shifting rods 18 and 19 are in "neutral" position. Now, assuming that the operator of the automobile desires to throw the gears of the transmission into low speed, the push button *a*, which carries the numeral 1 for indicating "low speed," will be pushed downwardly thereby rocking the rocker lever 29 which will tilt the standard 27 by virtue of the connecting link 32 and thereby move the operating finger 22 into the notch 26 which is disposed directly below the end of the operating finger. The ends of all of the other operating fingers are clear of the notches. The driver now releases the pressure which he has applied to the clutch pedal and the pedal is thereby drawn backwardly for moving the clutch into engaged position. The tension spring 17 draws the crank bar 10 backwardly thereby rotating the gear 4 and moving the rack bars 6 and 7. As the operating finger 22 is connected to the retaining arm 21 which is carried by the rack bar 7 the gear shifting rod 18 will be moved in the direction indicated by the arrow, adjacent the word "low," and the gears in the transmission thereby thrown into "low speed."

Any one of the other speeds is obtained in the same manner.

From the foregoing it will be observed that a very simple and durable gear shifting mechanism has been provided, the details of which embody the preferred form. I desire it to be understood however, that slight changes in the minor details of construction may be made without departing from the spirit of the invention or the scope of the claims hereunto appended.

I claim:

1. In a gear shifting mechanism, the combination with the gear shifting rods of the transmission system and the clutch pedal of an automobile, of means normally disposed above and free from engagement with the said rods and adapted to be moved for engagement with either of the rods at different points thereon, operating means connected to said clutch pedal and coacting with the said first mentioned means for causing the said latter means to move into engagement with the said rods at the desired points thereon, and means for controlling the said first mentioned means whereby the desired rod and the desired point thereon will be engaged by the said first mentioned means.

2. In a gear shifting mechanism, the combination with the gear shifting rods of the transmission system and the clutch pedal of an automobile, the said gear shifting rods being provided with notches, of rod shifting means adapted to be engaged with any of the said notches, arms for supporting the said means, gearing mechanism associated with the said arms for changing the relative positions of the said means, and means establishing connection between the said gearing mechanism and the said clutch pedal whereby the said mechanism will be operated when the said clutch pedal is operated.

3. In a gear shifting mechanism, the combination with the gear shifting rods of the transmission system and the clutch pedal of an automobile, the said gear shifting rods being provided with a plurality of notches, of means normally disposed above said rods and adapted to be moved into and out of engagement with said notches, arms for supporting said means, means associated with said arms and connected to said clutch pedal for moving said first mentioned means into position above said notches when said clutch pedal is moved to released position, and means connected to said first mentioned means and adapted to be manually operated for moving said first mentioned means into engagement with said notches whereby movement may be imparted to one of said rods when said clutch pedal is moved to operate the clutch.

4. In a gear shifting mechanism, the combination with gear shifting rods of the transmission system and the clutch pedal of an automobile, of means adapted to engage said gear shifting rods for imparting movement to said rods when said means is operated, means carried by the automobile and connected to said clutch pedal for imparting movement to said means when said clutch pedal is operated, said means including a spur-gear and rack bars engaging said spur-gear, said rack bars being connected to said first mentioned means for imparting movement thereto when said spur-gear is rotated, and means for rotating said spur-gear when said clutch pedal is operated.

5. In a gear shifting mechanism, the combination with gear shifting rods of the transmission system and the clutch pedal of an automobile, of means normally disposed above and free from engagement with said rods and adapted to shift said rods after being engaged therewith, means for manually operating said first mentioned means for intermittently engaging said means with said rods including a plurality of push buttons connected to said first mentioned means, and means connected to said clutch pedal and co-acting with said first mentioned means for moving said means when in engagement with said rods.

6. In a gear shifting mechanism, the combination with gear shifting rods of the transmission system and the clutch pedal of an automobile, of gearing mechanism supported from the floor of the automobile, means connected to said gear mechanism and to said clutch pedal for operating said gearing mechanism when said clutch pedal is operated, said gearing mechanism including arms disposed above said gear shifting rods, and means carried by said arms and adapted to be moved into and out of engagement with said rods whereby said rods may be moved when said gearing mechanism is operated.

7. In a gear shifting mechanism, the combination with gear shifting rods of the transmission system and the clutch pedal of an automobile, of gearing mechanism supported from the floor of the automobile, means connected to said gear mechanism and to said clutch pedal for operating said gearing mechanism when said clutch pedal is operated, said gearing mechanism including retaining arms disposed above said gear shifting rods, means carried by said retaining arms and adapted to be moved into and out of engagement with said rods whereby said rods may be moved when said gearing mechanism is operated, and manually operated means for moving said first mentioned means into or out of engagement with said rods.

8. In a gear shifting mechanism, the combination with gear shifting rods of the transmission system and the clutch pedal of an automobile, of gearing mechanism supported from the floor of the automobile, means connected to said gear mechanism and to said clutch pedal for operating said gearing mechanism when said clutch pedal is operated, said gearing mechanism including retaining arms disposed above said gear shifting rods, means carried by said retaining arms and adapted to be moved into and out of engagement with said rods whereby said rods may be moved when said gearing mechanism is operated, manually operated means for moving said first mentioned means into or out of engagement with said rods, including a plurality of push buttons connected to said first mentioned means and disposed in position adjacent the steering wheel of the automobile.

In testimony whereof I affix my signature in presence of two witnesses.

ALBERT H. BENNINGTON.

Witnesses:
  G. W. YOUNG,
  FRANK LISKA.